(12) United States Patent
Tanaka et al.

(10) Patent No.: US 8,087,697 B2
(45) Date of Patent: Jan. 3, 2012

(54) SEAT BELT APPARATUS AND SEAT BELT CONTROL METHOD

(75) Inventors: Koji Tanaka, Tokyo (JP); Daisuke Murakami, Tokyo (JP)

(73) Assignee: Takata Corporation, Tokyo (JP)

( * ) Notice: Subject to any disclaimer, the term of this patent is extended or adjusted under 35 U.S.C. 154(b) by 195 days.

(21) Appl. No.: 12/310,962

(22) PCT Filed: Oct. 30, 2007

(86) PCT No.: PCT/JP2007/071144
§ 371 (c)(1),
(2), (4) Date: Mar. 13, 2009

(87) PCT Pub. No.: WO2008/062641
PCT Pub. Date: May 29, 2008

(65) Prior Publication Data
US 2010/0001503 A1    Jan. 7, 2010

(30) Foreign Application Priority Data

Nov. 22, 2006 (JP) .................................. 2006-315407

(51) Int. Cl.
*B60R 22/03* (2006.01)
*B60R 22/34* (2006.01)
(52) U.S. Cl. ......... 280/807; 180/268; 297/481; 297/482
(58) Field of Classification Search .................. 280/807, 280/803; 180/268, 273; 297/474, 475, 481, 297/482
See application file for complete search history.

(56) References Cited

U.S. PATENT DOCUMENTS

| | | | | |
|---|---|---|---|---|
| 4,496,170 A | * | 1/1985 | Sasaki et al. | 280/801.1 |
| 4,682,789 A | * | 7/1987 | Higuchi et al. | 280/801.1 |
| RE34,051 E | * | 9/1992 | Deegener et al. | 297/468 |
| 5,431,446 A | * | 7/1995 | Czarnecki et al. | 280/802 |
| 6,308,986 B1 | * | 10/2001 | Townsend et al. | 280/807 |
| 6,374,938 B2 | * | 4/2002 | Yano et al. | 180/268 |
| 6,676,162 B2 | * | 1/2004 | Gyllenspetz et al. | 280/808 |
| 6,715,792 B2 | * | 4/2004 | Yamachi et al. | 280/801.2 |
| 7,308,348 B2 | * | 12/2007 | Tanaka et al. | 701/45 |
| 7,431,119 B2 | * | 10/2008 | Tanaka | 180/268 |
| 7,631,720 B2 | * | 12/2009 | Takao et al. | 180/268 |
| 7,681,683 B2 | * | 3/2010 | Takao et al. | 180/268 |
| 7,712,567 B2 | * | 5/2010 | Tanaka et al. | 180/268 |
| 2005/0154517 A1 | | 7/2005 | Tanaka et al. | |
| 2006/0181073 A1 | * | 8/2006 | Sugiyama et al. | 280/801.1 |

FOREIGN PATENT DOCUMENTS

JP    2-69556    5/1990

(Continued)

*Primary Examiner* — Drew Brown
(74) *Attorney, Agent, or Firm* — Foley & Lardner LLP

(57) ABSTRACT

To allow an occupant to easily wear a seat belt without twisting his or her body when the occupant sits in a seat.
When a door sensor 60 detects the opening of a door, a motor is driven to wind up a seat belt 2 so as to move a belt guide 4 against biasing force of a spring 9, thereby evacuating the seat belt 2 to a rear side of a vehicle relative to a seat back 1*a*. When the door sensor 60 detects the closing of the door and a seat sensor 61 detects the sitting of the occupant, the motor is driven in the reverse direction to make a clutch mechanism 34 in the disconnected state so as to protrude the seat belt 2 in the forward direction of the vehicle by the biasing force of the spring 9.

5 Claims, 17 Drawing Sheets

FOREIGN PATENT DOCUMENTS

| | | |
|---|---|---|
| JP | 2004-148916 | 5/2004 |
| JP | 2005-199783 | 7/2005 |
| JP | 2006-82583 | 3/2006 |
| JP | 2006-103633 | 4/2006 |

* cited by examiner

US 8,087,697 B2

SEAT BELT APPARATUS AND SEAT BELT CONTROL METHOD

TECHNICAL FIELD

The present invention relates to a seat belt apparatus in which a tongue, supported by a seat belt, is latched into a buckle, connected to a vehicle stationary-side member, and relates to a seat belt control method.

BACKGROUND ART

In a so-called three-point seat belt apparatus, a retractor is disposed on a lower portion of a pillar or the like, one side of a seat belt is wound onto a reel of the retractor, the seat belt is extended upwardly and is folded back by a deflection fitting disposed on an upper portion of the pillar, a portion after the fold of the seat belt is inserted into a tongue, and the other end of the seat belt is connected to a vehicle body (see, for example, Patent document 1).
Patent document 1: JP-A-2006-103633

DISCLOSURE OF THE INVENTION

Problems to be Solved by the Invention

However, the conventional seat belt apparatus as mentioned above has a problem that it is troublesome to pick up the tongue. That is, just after an occupant gets on a vehicle and sits in a seat and before the occupant wears the seat belt, the occupant is required to twist his or her body backward in order to pick up the tongue because the tongue is positioned on a side of a seat back of the seat in which the occupant sits.

It is an object of the present invention to provide a seat belt apparatus and a seat belt control method which allow an occupant to easily wear a seat belt in a state that the occupant sits in a seat without twisting his or her body.

Means for Solving the Problems

To achieve the aforementioned object, the first invention is characterized by comprising: a retractor having a reel onto which one end side of a seat belt is wound, a motor for rotating the reel, and a clutch mechanism which transmits driving power from a driving shaft of the motor to a shaft of said reel relative to the rotation of the driving shaft of the motor in the seat belt winding direction and which blocks the transmission of the driving power from said driving shaft to the shaft of said reel relative to the rotation of said driving shaft in the seat belt withdrawing direction; a belt guide which is supported at its proximal end pivotally in the forward/backward directions of the vehicle to guide the other end portion of said seat belt; a spring for biasing said belt guide in the forward direction of the vehicle; a buckle connected to a stationary member of said vehicle; and a tongue which is disposed on said seat belt and can be latched into said buckle.

The second invention has the same features of the first invention and is characterized by further comprising: a door sensor for detecting the opening/closing of a door; and a control unit for control said motor of said retractor according to a detection signal of said door sensor.

The third invention has the same features of the second invention and is characterized by further comprising: a seat sensor for detecting when the occupant sits in a seat, wherein said motor of said retractor is controlled according to a detection signal of said seat sensor.

The fourth invention is characterized in that when a door sensor detects that a door is opened, a seat belt is evacuated to a rear side of a vehicle by driving a motor of a retractor in the normal direction to transmit driving power to the reel through a clutch so as to wind up one end side of said seat belt onto said reel and thus to pivotally move a belt guide, which guides the other end side of said seat belt, against biasing force of a spring.

The fifth invention has the same features as the fourth invention and is characterized in that when a seat sensor detects that an occupant sits in a seat, said seat belt is protruded in the forward direction of the vehicle by driving the motor of said retractor in the reverse direction to make said clutch in the disconnected state blocking the transmission of the driving force and thus to move said belt guide to the initial position by biasing force of said spring.

Effect of the Invention

According to the present invention, the seat belt is protruded in the forward direction of the vehicle with the biasing force of the spring by making the clutch in the disconnected state, thereby allowing the occupant to easily wear the seat belt in the state that the occupant sits in the seat without twisting his or her body.

BEST MODE FOR CARRYING OUT THE INVENTION

Hereinafter, embodiments of the present invention will be described with reference to the attached drawings.

FIG. 1 through FIG. 5 are schematic illustrations showing the operation of a seat belt in a seat belt apparatus according to the present invention. FIG. 1 is an illustration showing the initial state of the seat belt, FIG. 2 is an illustration showing a state that the seat belt is moved in the backward direction of a vehicle, FIG. 3 is an illustration showing a state that the seat belt is protruded in the forward direction of the vehicle, FIG. 4 is an illustration showing a state that the seat belt is worn by an occupant, and FIG. 5 is an illustration showing a state that the seat belt is moved in the backward direction of the vehicle when the occupant gets off the vehicle.

In FIG. 1 through FIG. 5, the seat belt apparatus has a retractor 10 which is located on one side of a seat 1 and is fixed to a floor panel or the like. A portion of a seat belt 2 withdrawn from a state wound onto a reel 11 of the retractor 10 extends through a deflection fitting 3 (shoulder anchor) disposed on an upper portion of a center pillar or the like and is folded back and guided by the deflection fitting 3 to extend downwardly. The end of an after-fold portion 2a of the seat belt 2 is retained by a belt guide 4 which is located on one side of the seat 1 and is pivotally disposed on a floor panel or the like. A tongue 5 is slidably attached to the after-fold portion 2a of the seat belt 2. On the other hand, a buckle 6 is located on the other side of the seat 1 and is fixed to a floor panel or the like. By latching the tongue 5 on the seat belt 2 into the buckle 6, the occupant is restrained to the seat 1.

FIG. 6 is a sectional view taken along a line VI-VI in FIG. 1. In FIG. 6, the belt guide 4 is formed to cover the end portion of the seat belt 2, and the base of the belt guide 4 is pivotally held by an anchor 8 (lap anchor) fixed to the floor panel or the like. A torsion coil spring 9 is wound onto a bolt 7 of the guide casing (sic) 4 such that one end thereof is fixed to the belt guide 4 and the other end thereof is fixed to the anchor 8 or the like. The belt guide 4 is biased in the forward direction of the vehicle by the torsion coil spring 9. The end of the seat belt 2 is fixed to the proximal end of the belt guide 4 by means of a pin 4a.

FIG. 7 through FIG. 9 are perspective views showing the retractor 10, wherein FIG. 7 is an exploded perspective view showing the entire structure thereof, FIG. 8 and FIG. 9 are partial extracted enlarged views of FIG. 7.

The frame 12 of the retractor 10 is formed in a U-like shape comprising a pair of parallel side walls 12a, 12b and a back wall 12c connecting the side walls 12a, 12b. Formed in the both side walls 12a, 12b of the frame 12 are large-diameter holes 12d, 12e.

On the outer surface of the side wall 12a of the frame 12, a first retainer 13, a cover 14, a spring casing 15, and a pretensioner cassette 15 are attached in this order. On the outer surface of the side wall 12b, a second retainer 17 is attached.

On the other hand, the reel 11 of the retractor 10 has a cylindrical shape of which one end is closed. From the center of the closed end of the reel 11, a shaft 18 projects outwardly. The shaft 18 comprises a large-diameter shaft portion 18a, a middle-diameter shaft portion 18b, and a small-diameter shaft portion 18c, as shown in FIG. 8. The large-diameter shaft portion 18a and the middle-diameter shaft portion 18b have splines formed therein.

The retractor 10 is provided with a torsion bar 19 comprising a force limiter mechanism A. Fixed to one end of the torsion bar 19 is a locking base 20 as one of components of an emergency locking mechanism B as will be described later. The end 19a of the torsion bar 19 is inserted into the reel 11 through the opening of the same and the end 19a is connected integrally to the closed end of the reel 11.

On the locking base 20, a shaft 21 extending in the direction opposite to the torsion bar 19 is formed.

The reel 11 is positioned between the side walls 12a, 12b of the frame 12 such that the small-diameter shaft portion 18c of the shaft 18 is rotatably supported by the pretensioner cassette 16 and the shaft 21 is rotatably supported by the second retainer 17.

A motor 22 is supported by the first retainer 13. The motor 22 is provided for forcibly driving the reel 11. The driving shaft 22a of the motor 22 is interlinked with the shaft 18 of the reel 11 via a power transmission mechanism C.

The power transmission mechanism C is provided with a planetary gear train which is accommodated in a large-diameter hole 13a formed in the first retainer 13. The planetary gear train comprises three planetary gears 23 which are rotatably supported by a peripheral portion of the carrier 24. The carrier 24 is provided at its center with a spline hole 24a which is engaged with the spline of the large-diameter shaft portion 18a of the reel 11. Internal teeth 25a of an internal gear 25 mesh with the planetary gears 23 in such a manner as to surround the planetary gears 23. A sun gear 26 is rotatably held by the large-diameter shaft portion 18a of the reel 11 and meshes with the planetary gears 23. Further, the sun gear 26 is integrally engaged with a central hole 27a of a large-diameter gear 27. External teeth of 27b of the large-diameter gear 27 is interlinked with a motor gear 30 fixed to the driving shaft 22a of the motor 22 via an intermediate gear 28, which is rotatably supported on the first retainer 13, and a connecter gear 29, which is rotatably supported on the first retainer 13.

In the power transmission mechanism C, a clutch mechanism D intervenes. The clutch mechanism D is provided for selectively shutting off the power transmission from the motor 22 to the reel 11 and comprises, as shown in FIG. 9, a spring holding member 31 attached to a side surface of the connecter gear 29, a lever spring 32 and the like. The spring holding member 31 is provided around its periphery with projections each having a groove 31b. The spring holding member 31 is attached to the side surface of the connecter gear 29 by pins 31a. The lever spring 32 has a curved portion 32a at its one end. By inserting the curved portion 32a in the grooves 31b of the spring holding member 31, the lever spring 32 is rotatably supported by the spring holding member 31. On the other end of the lever spring 32, an engaging lever 33 is disposed. The engaging lever 33 is provided with at its end with a claw 33a. The claw 33a is positioned to face the external teeth 25b formed on the periphery of the internal gear 25.

FIG. 10 and FIG. 11 are sectional views for explaining the action of the power transmission mechanism C. In the retractor 10 with the power transmission mechanism C, as the shaft 22a of the motor 22 is rotated in the seat belt winding direction (the CCW (sic) direction) as shown in FIG. 10, the power is transmitted to the connecter gear 29 via the motor gear 30 to rotate the connecter gear 29 in the CCW direction. Then, the engaging lever 33 is moved via the lever spring 32 so that the claw 33a thereof is engaged with one of the external teeth 25b of the internal gear 25.

On the other hand, the rotation of the connecter gear 29 is transmitted to the planetary gears 23 via the intermediate gear 28, the large-diameter gear 27, and the sun gear 26.

In this case, the internal gear 25 is stopped from rotating by the claw 33a of the engaging lever 33, whereby the planetary gears 23 revolve along the internal teeth 25a of the internal gear 25 while rotating about their own axes. According to this revolution of the planetary gears 23, the carrier 24 is rotated and the reel 11 is rotated via the shaft 18 in the seat belt winding direction (the CCW direction). Therefore, the seat belt 2 is forcibly wound up.

As the motor 22 is driven so that the shaft 22a is rotated in the seat belt withdrawing direction (the CW (sic) direction) as shown in FIG. 11, the power is transmitted to the connecter gear 29 via the motor gear 30 so as to rotate the connecter gear 29 in the CW direction. Then, the engaging lever 33 is moved via the lever spring 32 so that the claw 33a thereof moves apart from the external teeth 25b of the internal gear 25.

On the other hand, the rotation of the connecter gear 29 is transmitted to the planetary gears 23 via the intermediate gear 28, the large-diameter gear 27, and the sun gear 26.

In this case; since the claw 33a of the engaging lever 33 is spaced apart from the external teeth 25b of the internal gear 25 so that the internal gear 25 is allowed to rotate, the planetary gears 23 rotate the internal gear 25 without revolving. Therefore, the carrier 24 is not rotated and the reel 11 is also not rotated.

The retractor 10 has a spring mechanism E for always biasing the reel 11 in the seat belt winding direction (the CCW direction). The spring mechanism E is provided for biasing the reel 11 in such a direction as to retract the seat belt 2 onto the reel 11. When not loaded, i.e. when the seat belt 2 is not used, the spring mechanism E holds the seat belt 2 in the accommodated state. When the seat belt 2 is used, the spring mechanism E restrains the occupant by always biasing the seat belt to be in contact with the occupant with small force and allowing the seat belt 2 to be easily withdrawn when the occupant moves his or her upper body forward.

The spring mechanism E comprises a return spring 34 composed of a spiral spring. The return spring 34 is accommodated in a space between the cover 14 and the spring casing 15 such that an inner end 34a is engaged with a bush 35 splined to the middle-diameter shaft 18b of the reel 11 and an outer end 34b is fixed to an inner peripheral surface of the spring casing 15.

The retractor 10 further comprises a locking mechanism F. The locking mechanism F is provided for preventing the occupant from colliding with a frontal obstacle or the like by immediately restricting the seat belt 2 from being withdrawn when the seat belt 2 is rapidly withdrawn such as when braking.

The locking mechanism F comprises a lock gear 36, a flywheel 37, and ratchet teeth 17a formed in the second retainer 17.

The flywheel 37 has a claw 37a at its distal end and is pivotally supported at its proximal end on a side surface of the lock gear 36. The flywheel 37 is biased in the radial inner direction of the lock gear 36 by a spring 38 disposed between the flywheel and the lock gear 36 so that the claw 37a is spaced apart from the ratchet teeth 17a of the second retainer 17.

In the locking mechanism F, as the seat belt 2 is rapidly withdrawn so that the reel 11 is rotated in the belt withdrawing direction (the CW direction) for example when braking, the lock gear 36 is also rapidly rotated according to the rotation of the reel 11, but the flywheel 37 does not follow the rotation of the lock gear 36 and moves against the biasing force of the spring 38 so that the claw 37a is engaged with one of the ratchet teeth 17a of the second retainer 17. Therefore, the lock gear 36 is prevented from rotating, thereby preventing the reel 11 from rotating in the belt withdrawing direction (the CW direction). Accordingly, the seat belt 2 is restricted from being withdrawn.

As the braking is cancelled, the flywheel 37 returns to the original position so that the claw 37a is disengaged from the ratchet teeth 17a of the second retainer 17. Therefore, the lock of the reel 11 is cancelled.

For example, as the vehicle is suddenly decelerated such as in the event of a vehicle collision, the occupant tends to jump in the forward direction of the vehicle. At this point, the emergency locking mechanism B as mentioned above prevents the seat belt from being withdrawn so as to restrain the occupant to the seat.

The emergency locking mechanism B comprises a deceleration detecting means 39, a pawl 40 supported by the locking base 20, and ratchet teeth 41 formed in the inner surface of the large-diameter hole 12e of the frame side wall 12b.

The deceleration detecting means 39 comprising a lever 39a and a claw 39b at the end of the lever. The deceleration detecting means 39 is disposed on the outer surface of the side wall 12b of the frame 12 such that the claw 39b faces the ratchet teeth 36a of the lock gear 36.

The pawl 40 comprises a cam follower 40a which is formed on a side surface of an end portion thereof to project toward the lock gear 36 and a claw 40b which is formed at the end thereof. The pawl 40 is pivotally supported at its proximal end on the side surface of the locking base 20 and the cam follower 40a is inserted into a cam groove 36b formed in a side surface of the lock gear 36 so that the claw 40b is positioned to face the ratchet teeth 41. A spring 42 is disposed between the pawl 40 and the locking base 20 so that the claw 40b of the pawl 40 is positioned in a state spaced apart from the ratchet teeth 41.

According to the emergency locking mechanism B having the structure as mentioned above, the lever 39a of the deceleration detection means 39 is moved so as to engage the claw 39b with one of the ratchet teeth 36a of the lock gear 36 when the vehicle is rapidly decelerated.

On the other hand, as the vehicle is suddenly decelerated, load is applied to the occupant in the forward direction of the vehicle so that the seat belt is withdrawn and the reel 11 is rotated in the belt withdrawing direction (the CW direction). Accordingly, the locking base 20 is rotated via the torsion bar 19. However, since the lock gear 36 is prevented from rotating by the lever 39a of the deceleration detecting means 39, the cam follower 40a of the pawl 40 is moved, thereby engaging the claw 40b of the pawl 40 with one of the ratchet teeth 41. Therefore, the rotation of the locking base 20 is prevented so as to prevent the rotation of the reel 11, thereby preventing the withdrawal of the seat belt 2.

Since the withdrawal of the seat belt 2 is prevented relative to the sudden deceleration of the vehicle, the occupant can be securely restrained to the seat. If excessive restraining force acts on the occupant during the restraint, a torsion bar 19 composing the force limiter mechanism is twisted, thereby absorbing the restraining force.

FIG. 12 is a characteristic diagram showing an example of characteristics of the return spring and the torsion coil spring used in the seat belt apparatus according to the present invention. In FIG. 12, the return spring 34 has such characteristics that the biasing force thereof is gradually increased, maintaining relatively small biasing force, while the reel 11 rotates eight turns, the biasing force thereof is rapidly increased between the eighth turn and the twelfth turn of the reel 11, and the biasing force thereof is gradually increased between the twelfth turn and the twenty-sixth turn of the reel 11. On the other hand, the torsion coil spring 9 has such characteristics that the biasing force thereof is larger than the biasing force of the return spring 34 while the reel 11 rotates nine turns and the biasing force thereof becomes smaller than the biasing force of the return spring 34 after the ninth turn of the reel 11.

In the seat belt apparatus provided with the return spring 34 and the torsion coil spring 9 having the aforementioned characteristics, the reel 11 is biased to rotate about five to seven turns when the vehicle is in non operation, i.e. the engine of the vehicle is stopped. In this state, since the biasing force of the torsion coil spring 9 is larger than the biasing force of the return spring 34, the belt guide 4 is held in a state tilting in the forward direction of the vehicle (the initial state of the seat belt 2) because of the biasing force of the torsion coil spring 9 so that the after-fold portion 2a of the seat belt 2 with the tongue 5 protrudes forward. The biasing force of the return spring 34 in this state is positioned in a T1 zone in FIG. 12 mentioned above.

FIG. 13 is a control block diagram of the seat belt apparatus according to the present invention. In FIG. 13, the seat belt apparatus comprises a door sensor 60 for detecting the opening and closing of a door, a seat sensor 61 for detecting when an occupant sits in the seat 1, and a buckle sensor 62 for detecting when the tongue 5 is released from the buckle 6. The door sensor 60, the seat sensor 61, and buckle sensor 62 are connected to a control unit 63.

FIG. 14(a) and FIG. 14(b) are operational flow charts for the seat belt apparatus having the structure as mentioned above, wherein FIG. 14(a) corresponds to the operation when the occupant gets on the vehicle and FIG. 14(b) corresponds to the operation when the occupant gets off the vehicle.

As shown in the flow chart of FIG. 14(a), as the occupant opens the door when the seat belt 2 is in the initial state, the door sensor 60 detects the opening of the door (step S101). Accordingly, the motor 22 is driven in the normal direction (step S102) and the connecter gear 29 is rotated in the seat belt winding direction (the CCW direction). Then, the clutch mechanism D becomes to the connected state (ON state). Therefore, the power of the connecter gear 29 is transmitted to the reel 11 so as to rotate the reel in the seat belt winding direction (the CCW direction), thereby forcibly winding up the seat belt 2 for several turns. Then, after a predetermined times of turns, the motor 22 is stopped. The biasing force of the return spring 34 in this state is positioned in a T2 zone in FIG. 12 mentioned above.

As the seat belt 2 is wound onto the reel 11 against the biasing force of the torsion coil spring 9, the belt guide 4 is pivotally moved backward as shown in FIG. 2 mentioned above. As a result of this, the after-fold portion 2a of the seat belt 2 is positioned at the rear side of the vehicle relative to the front surface of the seat back 1a. Therefore, the seat belt 2 never disturbs the movement of the occupant when getting on the vehicle.

As the occupant sits in the seat cushion 1b of the seat 1, the seat sensor 61 detects the sitting of the occupant (step S103). Then, as the door is closed, the door sensor 60 detects the closing of the door (step S104). The closing of the door is detected by the door sensor 60 (step S104) (sic). Therefore, the motor 22 is driven in the reverse direction (step S105) so that the connecter gear 29 is rotated in the belt withdrawing direction (the CW direction) for a predetermined amount. Then, accordingly, the clutch mechanism D becomes the disconnected state (OFF state). As the clutch mechanism D becomes the OFF sate, the seat belt 2 is withdrawn from the reel 11 by the biasing force of the torsion coil spring 9 and the reel 11 is returned to the initial position. In this state, the tongue 5 on the after-fold portion 2a is positioned at the front side of the vehicle relative to the front surface of the seat back 1a as shown in FIG. 3. Therefore, the occupant can wear the seat belt by easily picking up the tongue 5 without twisting his or her body, as shown in FIG. 4.

For this, the tongue 5 is protruded forward on condition both that the closing of the door is detected by the door sensor 60 and that the sitting of the occupant is detected by the seat sensor 61. Since this prevents the tongue 5 from protruding forward before the door is closed like a case that the tongue 5 is protruded forward on condition only of the sitting of the occupant, the seat belt 2 never disturbs the movement of the occupant for closing the door after sitting in the seat. In addition, there is an effect of preventing vain movement of the tongue, i.e. preventing the tongue 5 from protruding forward again when the door is closed after the occupant completely gets off the vehicle unlike the case that the tongue 5 is protruded forward on condition only of the sitting of the occupant.

As shown in the flow chart of FIG. 14(b), as the occupant releases the tongue 5 from the buckle 6 (step S111) and opens the door (step S112) for allowing the occupant to gets off the vehicle, the motor 22 is driven (step S113) in the normal direction so as to rotate the connecter gear 29 in the seat belt winding direction (the CCW direction). Then, the clutch mechanism D becomes the connected state (ON state). Accordingly, the power of the connecter gear 29 is transmitted to the reel 11 so as to rotate the reel in the seat belt winding direction (the CCW direction), thereby forcibly winding up the seat belt 2. The motor 22 is stopped after the reel 11 is rotated for several turns.

As the seat belt 2 is wound onto the reel 11 against the biasing force of the torsion coil spring 9, the belt guide 4 is pivotally moved backward as shown in FIG. 5. As a result of this, the after-fold portion 2a of the seat belt 2 is positioned at the rear side of the vehicle relative to the front surface of the seat back 1a. Therefore, the seat belt 2 never disturbs the movement of the occupant when getting off the vehicle.

As the occupant gets off the vehicle and closes the door (step S114), the motor 22 is driven in the reverse direction (step S115) so as to rotate the connecter gear 29 in the belt withdrawing direction (the CW direction), thereby making the clutch mechanism D in the OFF state.

Since the tongue 5 is adapted to be moved backward on condition only that the opening of the door is detected by the door sensor 60, the tongue 5 is moved backward only by opening the door after releasing the tongue 5 of the seat belt 2 from the buckle 6 (even if the occupant is still sitting in the seat). Therefore, the seat belt 2 never disturbs the movement of the occupant for stepping out with his or her foot out of the vehicle and standing up unlike a case that the tongue 5 is moved backward on condition both that the opening of the door is detected and that the sitting of the occupant is not detected by the seat sensor 61.

In the aforementioned embodiment, the operation of the belt guide 4 is controlled based on the detection signals from the door sensor 60 for detecting the opening and closing the door, the seat sensor 61 for detecting the sitting of the occupant in the seat 1, and the buckle sensor 62 for detecting the release of the tongue 5 from the buckle 6. However, the present invention is not limited to this control so that various changes could be made without departing from the scope and the technical idea of the invention. Hereinafter, such variations will be described.

(1) In Case that the Tongue 5 is Adapted to be Moved Forward and Backward on Condition Only of the Opening and Closing of the Door For example, as shown in the flow chart of FIG. 15, it is also possible to control the belt guide 4 by driving the motor 22 only based on the detection signal from the door sensor 60. In this case, the opening of the door is detected (step S121). According to this detection, the motor 22 is driven in the normal direction, i.e. the seat belt winding direction (the CCW direction) (sic) (step S121). In addition, based on the detection of closing the door (step S123), the clutch mechanism is disconnected (step S124) so as to pivotally move the seat belt in the belt withdrawing direction (the CW direction) by the force of the torsion coil spring 9 of the belt guide 4.

In this case, when the door is opened to allow the occupant to get on the vehicle, the seat belt 2 protruding in the forward direction of the vehicle by the biasing force of the torsion coil spring 9 is evacuated to the rear side of the seat 1, thereby preventing the belt guide 4 from disturbing the movement of the occupant getting on the vehicle. When the door is closed, the seat belt 2 is returned to the state protruding in the forward direction of the vehicle, thereby allowing the easy latching of the tongue 5 of the seat belt 2 into the buckle 6. In addition, when the door is opened to allow the occupant to get off the vehicle, the seat belt 2 protruding in the forward direction of the vehicle by the biasing force of the torsion coil spring 9 is evacuated to the rear side of the seat 1, thereby preventing the belt guide 4 from disturbing the movement of the occupant getting off the vehicle.

(2) Others

Though the withdrawn end of the seat belt 2 is fixed to the proximal end of the belt guide 4 by the pin 4a in the aforementioned embodiment, the withdrawn end of the seat belt 2 may be fixed to the distal end of the belt guide 4 and the belt guide 4 may be fixed to the bolt 7 supported on the floor panel or the like.

Though the base portion (the lower side) of the belt guide 4 is pivotally held to the anchor 8 fixed to the floor panel of the vehicle or the like so that the belt guide 4 is moved pivotally about a portion near the bolt 7 at a lower portion of the vehicle by withdrawing the seat belt from the retractor 10, the invention is not limited thereto. That is, as shown in FIG. 16 corresponding to FIG. 1 and FIG. 17 as an illustration (partially sectional) as seen in a direction of the arrow A of FIG. 16, the base portion (the upper side) of the belt guide 4 may be pivotally held, for example, at a portion near the deflection fitting 3 in the vicinity of the pillar of the vehicle so that the belt guide 4 is moved pivotally about its upper side by the force of the torsion coil spring 9 in the clutch disconnected state as mentioned above so as to withdraw the seat belt 2. Also in this case, the belt guide 4 is adapted to be moved in the forward/backward direction of the vehicle according to the winding/withdrawal of the seat belt 2 by the retractor 10, thereby exhibiting the same effects of the aforementioned case.

Though detail illustrations are not shown, the base portion of the belt guide 4 may be pivotally held to a lap anchor (corresponding to the anchor 8) fixed to the vehicle seat 1 so that the belt guide 4 is moved pivotally about the lap anchor by the force of the torsion coil spring 9 in the clutch disconnected state relative to the retractor 10 fixed to the seat 1 (or a portion other than the seat 1) so as to withdraw the seat belt 2. The aforementioned shoulder anchor may be fixed to the seat 1. These cases also have the same effects.

Though the belt guide 4 is formed to surround the seat belt 2 in the aforementioned embodiments, the belt guide 4 may be formed in a band-like shape or a bar-like shape and arranged to extend along the seat belt 2. Moreover, the seat belt 2 may be formed to have a hollow structure and the belt guide 4 may be disposed inside the seat belt 2.

Though the belt guide 4 is biased by the torsion coil spring in the aforementioned embodiments, another spring such as a tension coil spring, a compression coil spring, and the like may be used.

Figure 1:
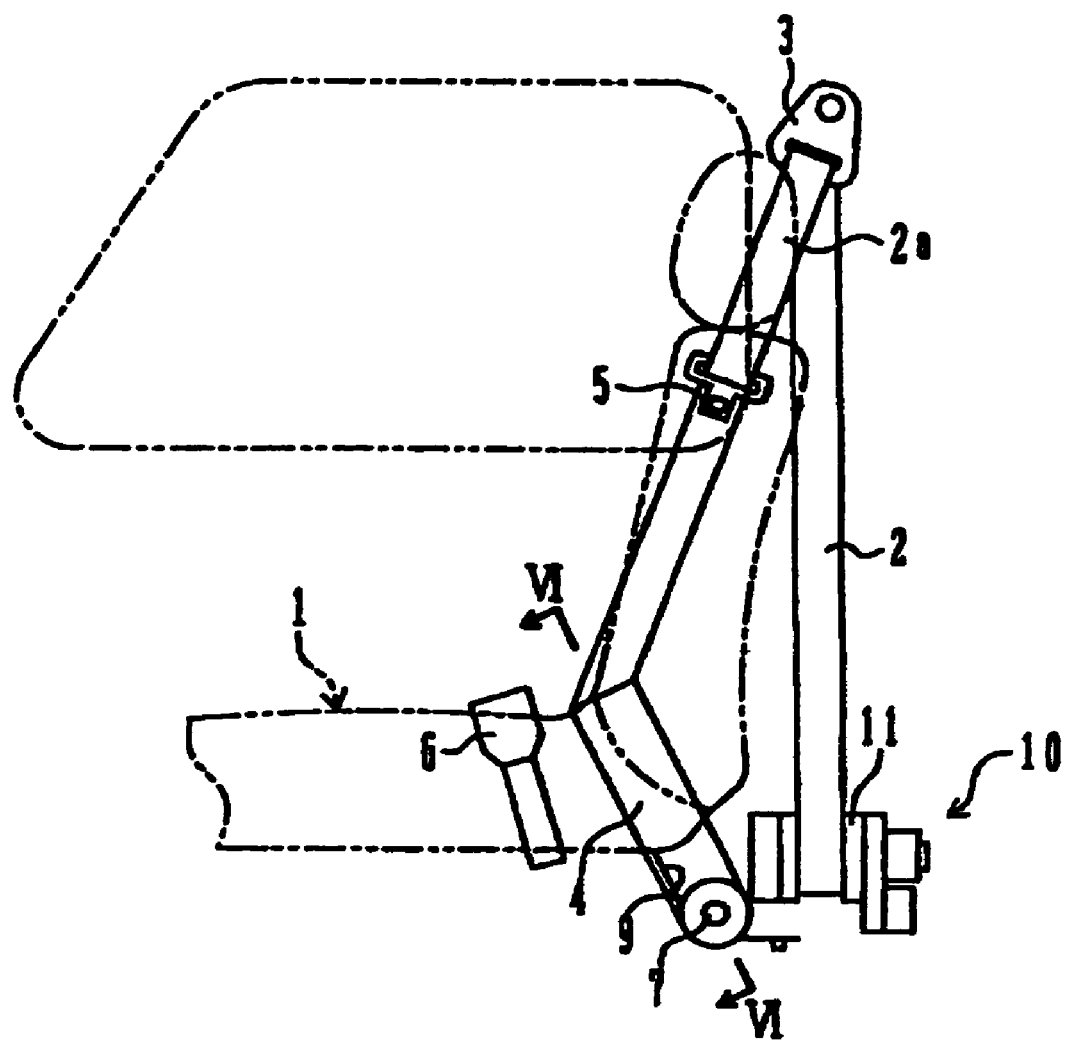
FIG. 1 is a schematic illustration showing the operation of a seat belt apparatus according to an embodiment of the present invention, illustrating the initial state of a seat belt.
Figure 2:
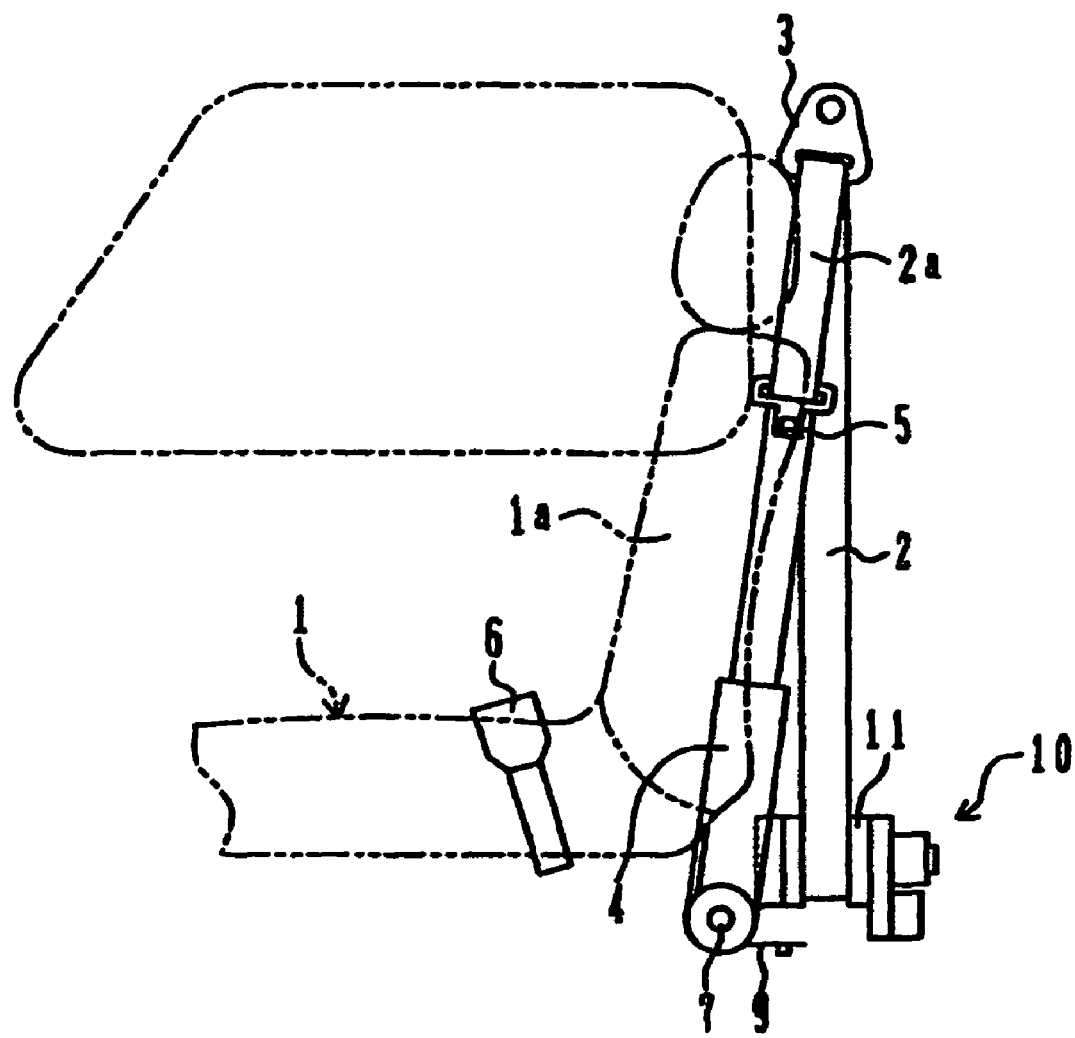
FIG. 2 is an illustration showing the state that the seat belt is moved to the rear side of the vehicle.
Figure 3:
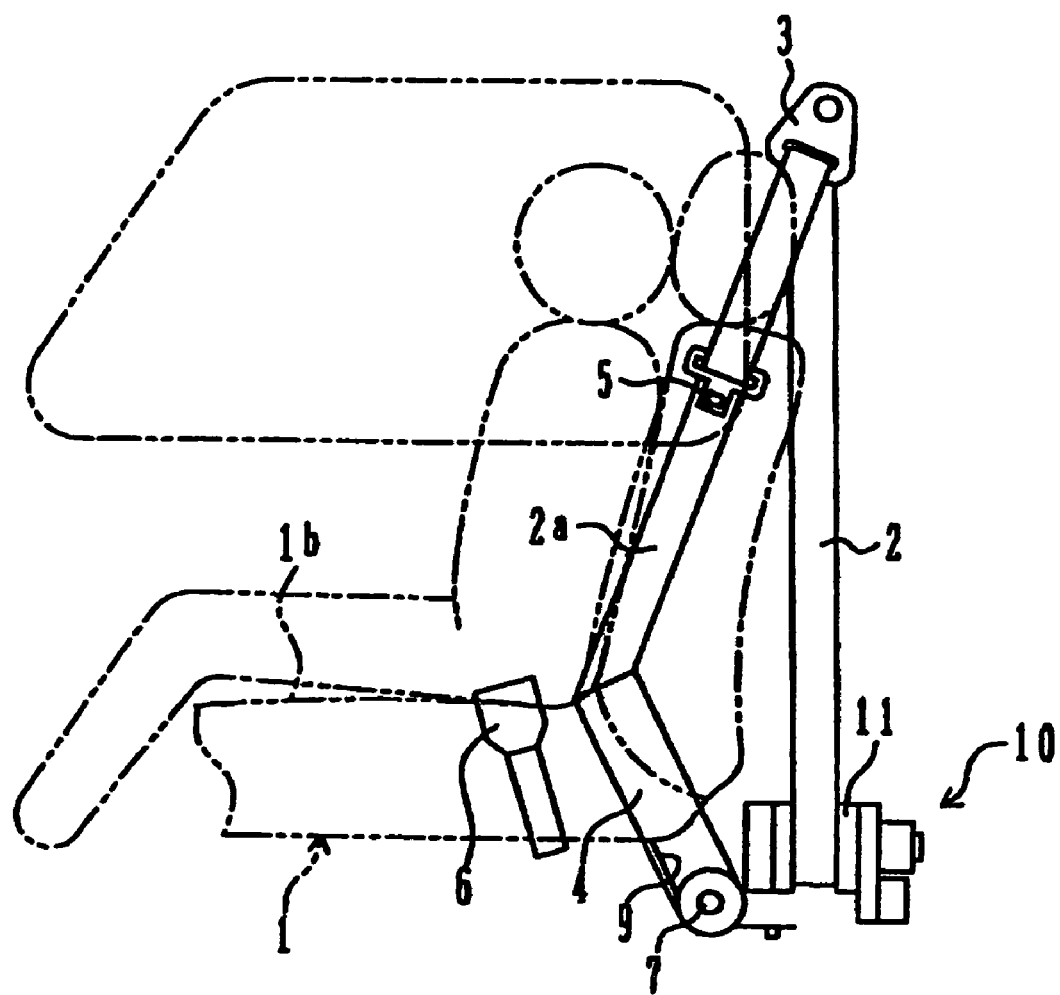
FIG. 3 is an illustration showing the state that the seat belt is protruded to the front side of the vehicle.
Figure 4:
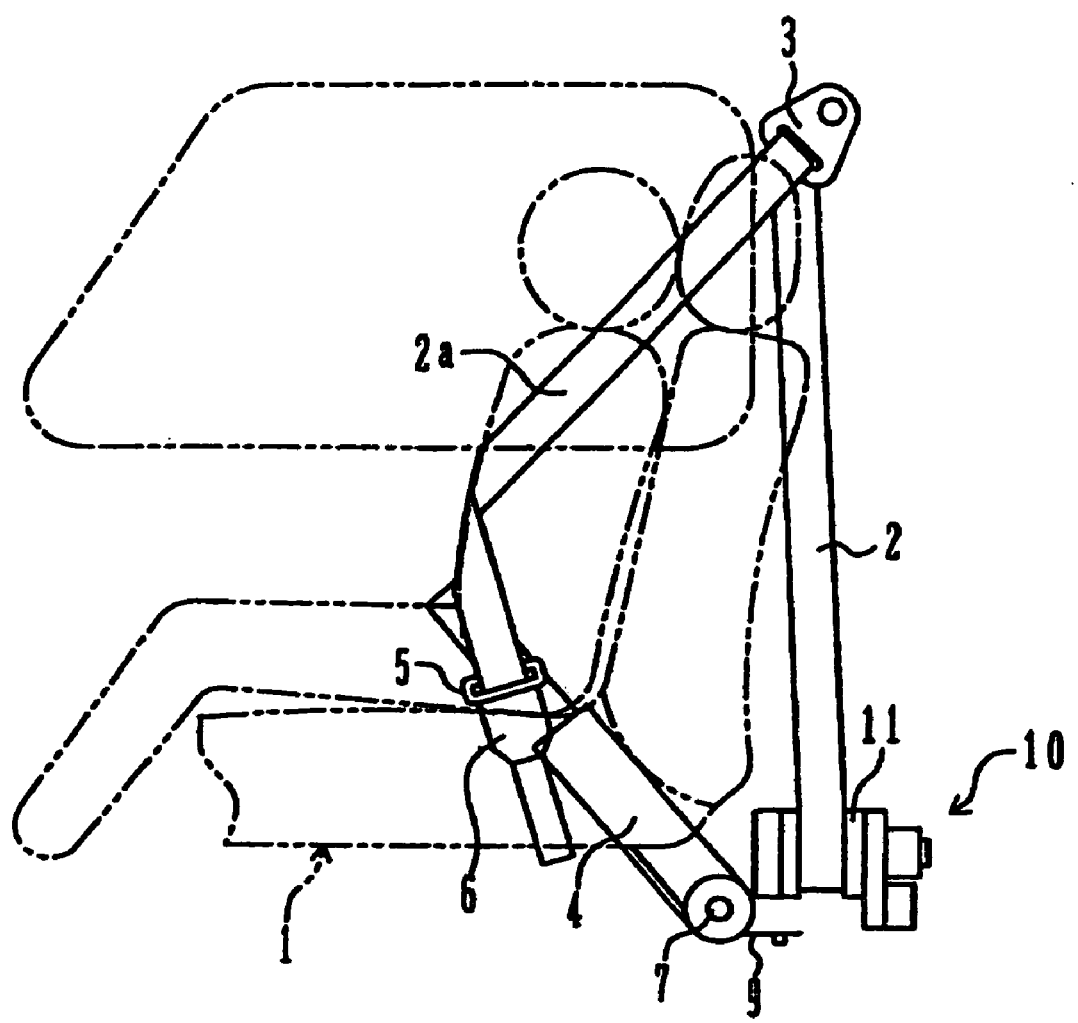
FIG. 4 is an illustration showing the state that the seat belt is worn by an occupant.
Figure 5:
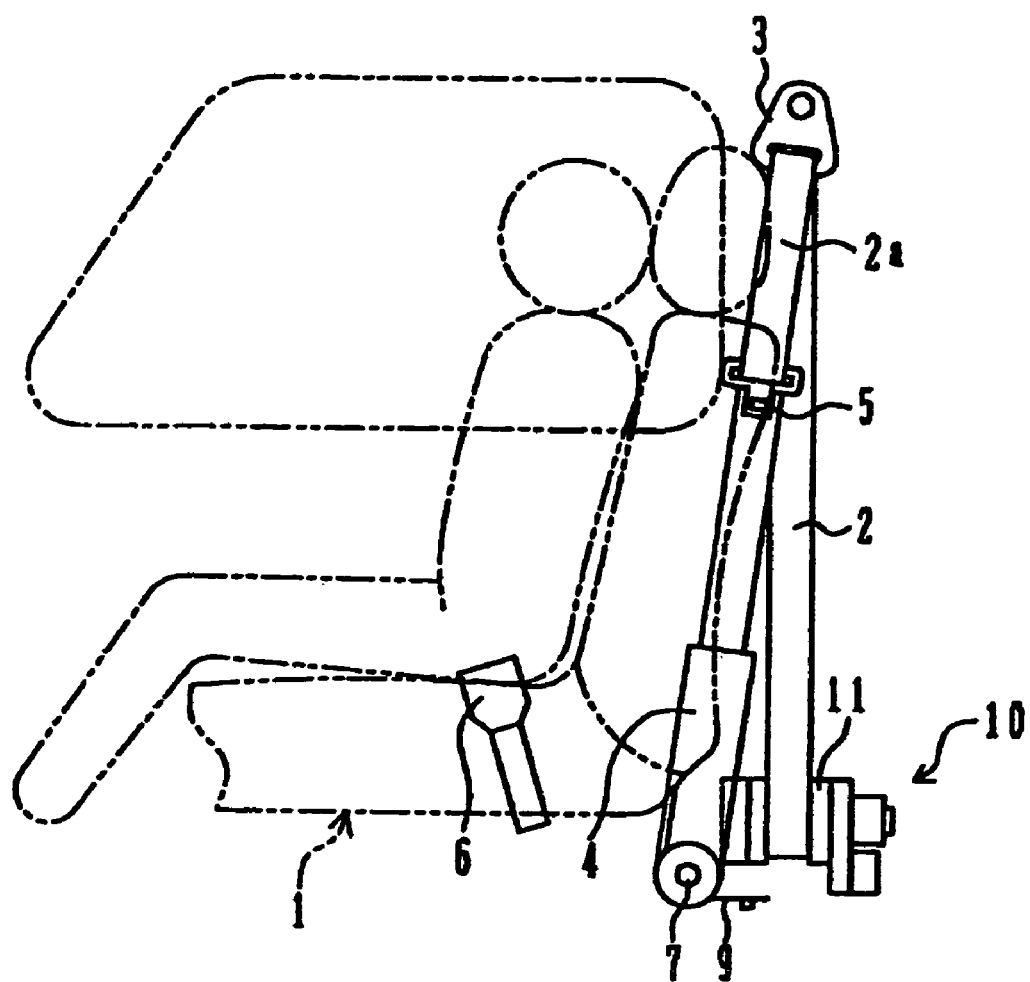
FIG. 5 is an illustration showing the state that the seat belt is moved to the rear side of the vehicle when the occupant is about to get off the vehicle.
Figure 6:
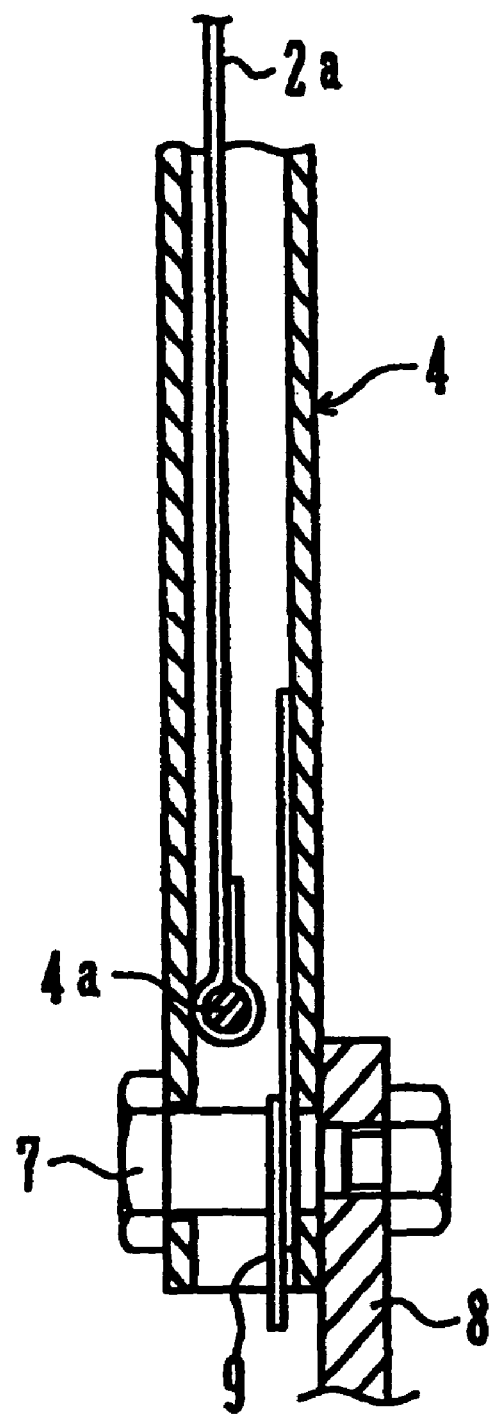
FIG. 6 is a sectional view taken along a line VI-VI of FIG. 1.
Figure 7:
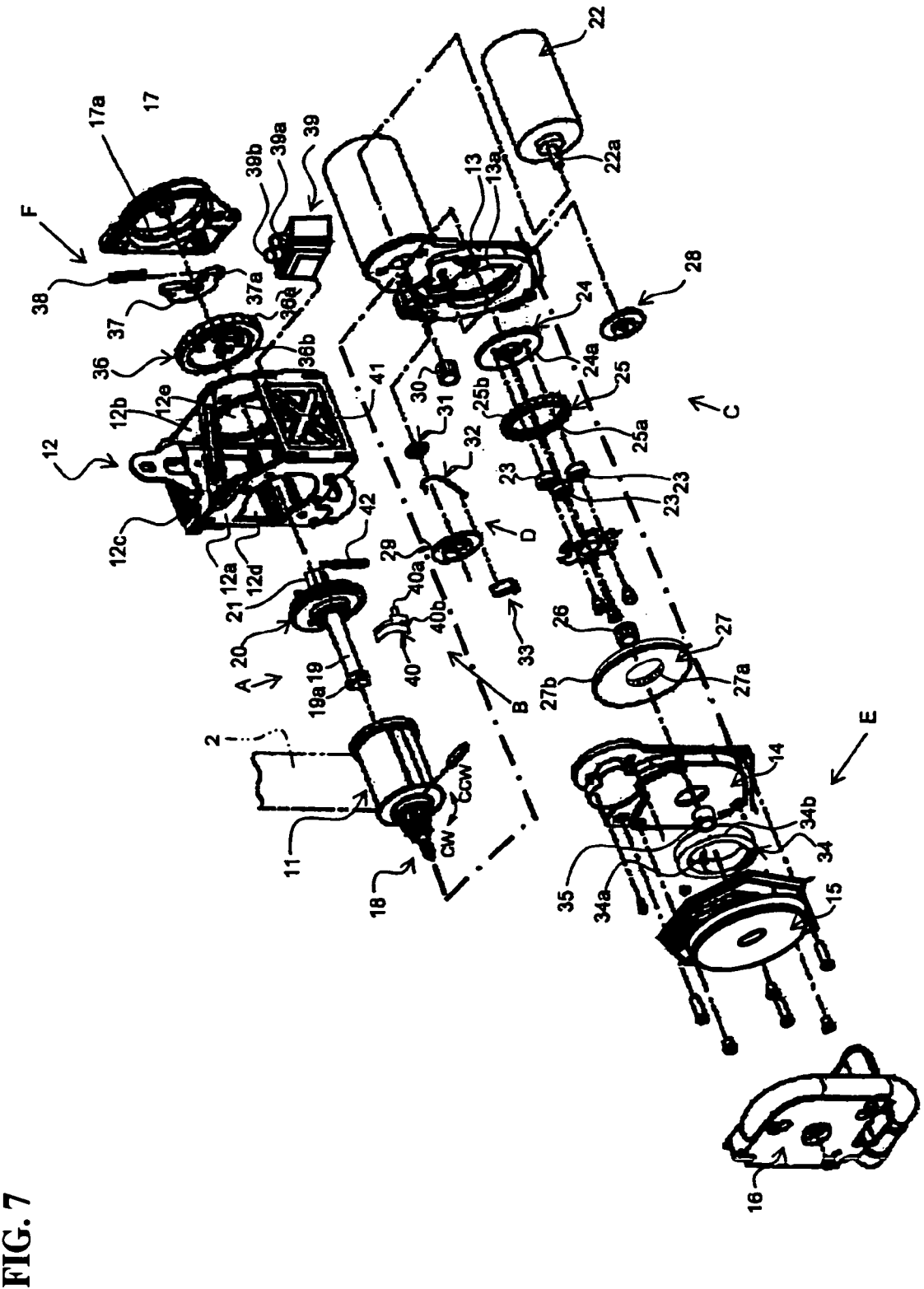
FIG. 7 is an exploded perspective view showing detailed structure of a retractor.
Figure 8:
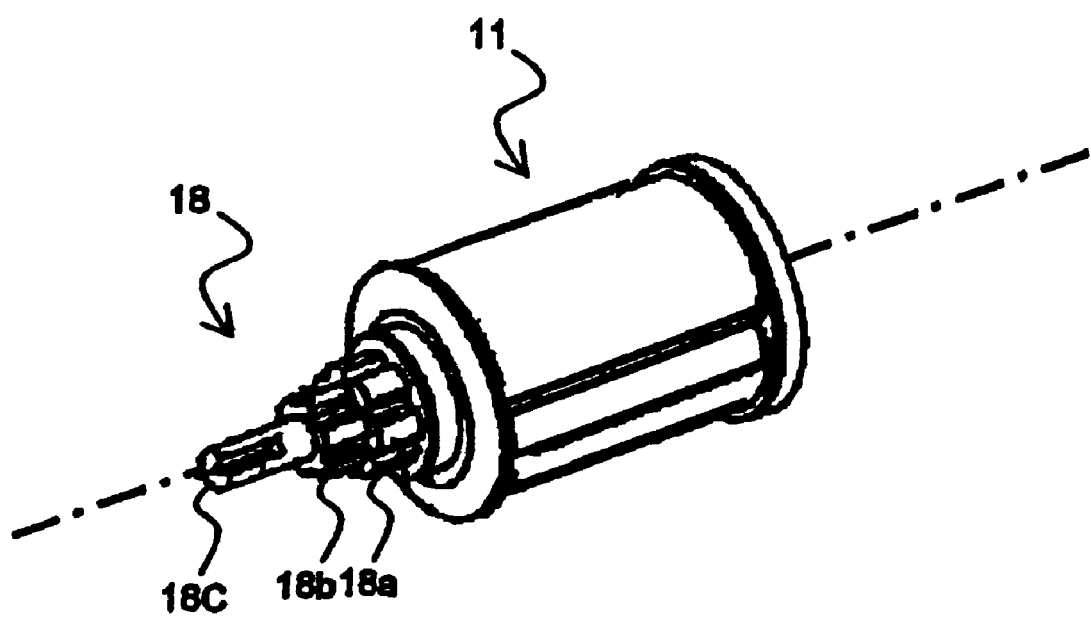
FIG. 8 is an exploded perspective view showing a part of the retractor.
Figure 9:
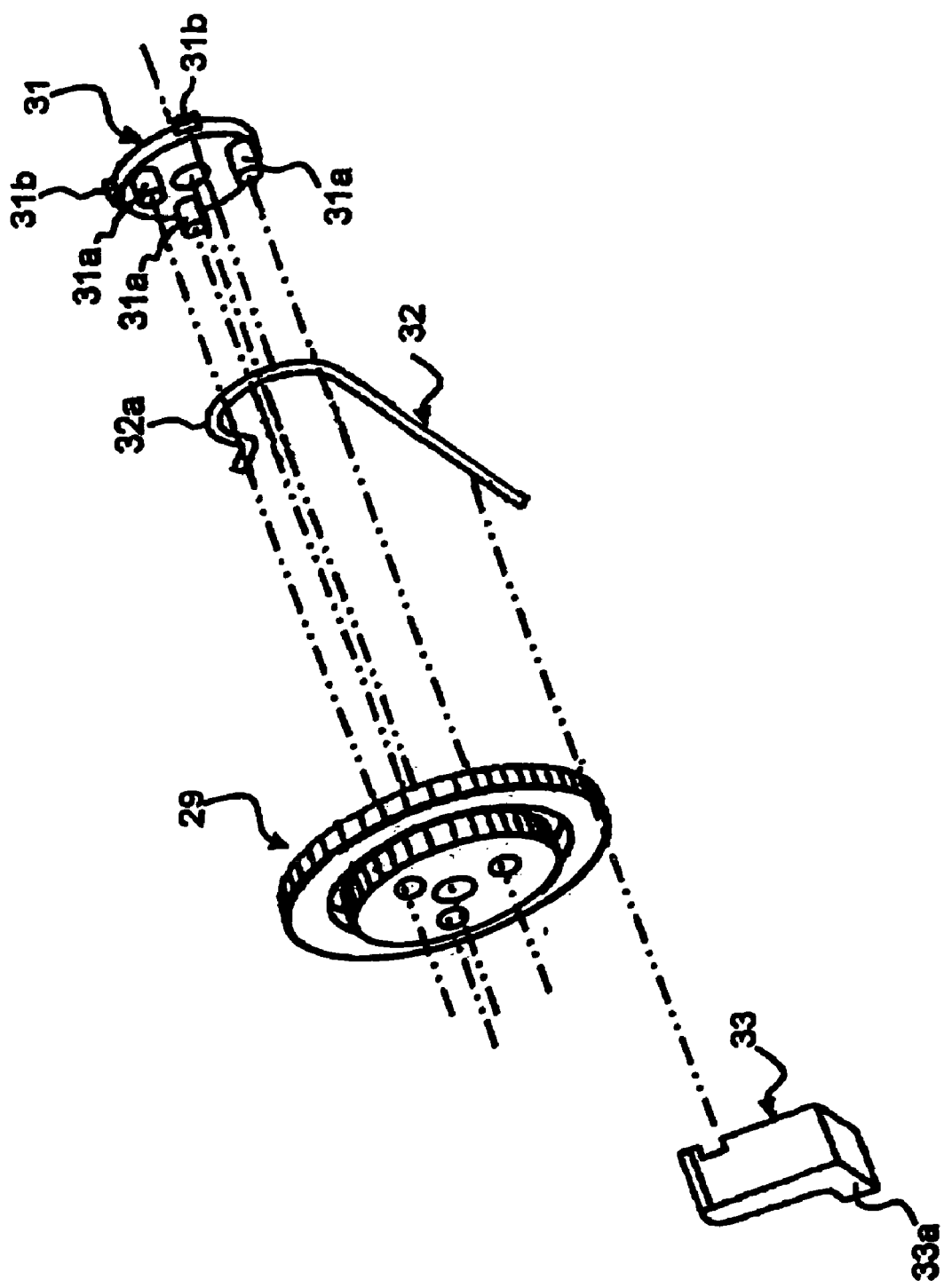
FIG. 9 is an exploded perspective view showing parts of the retractor.
Figure 10:
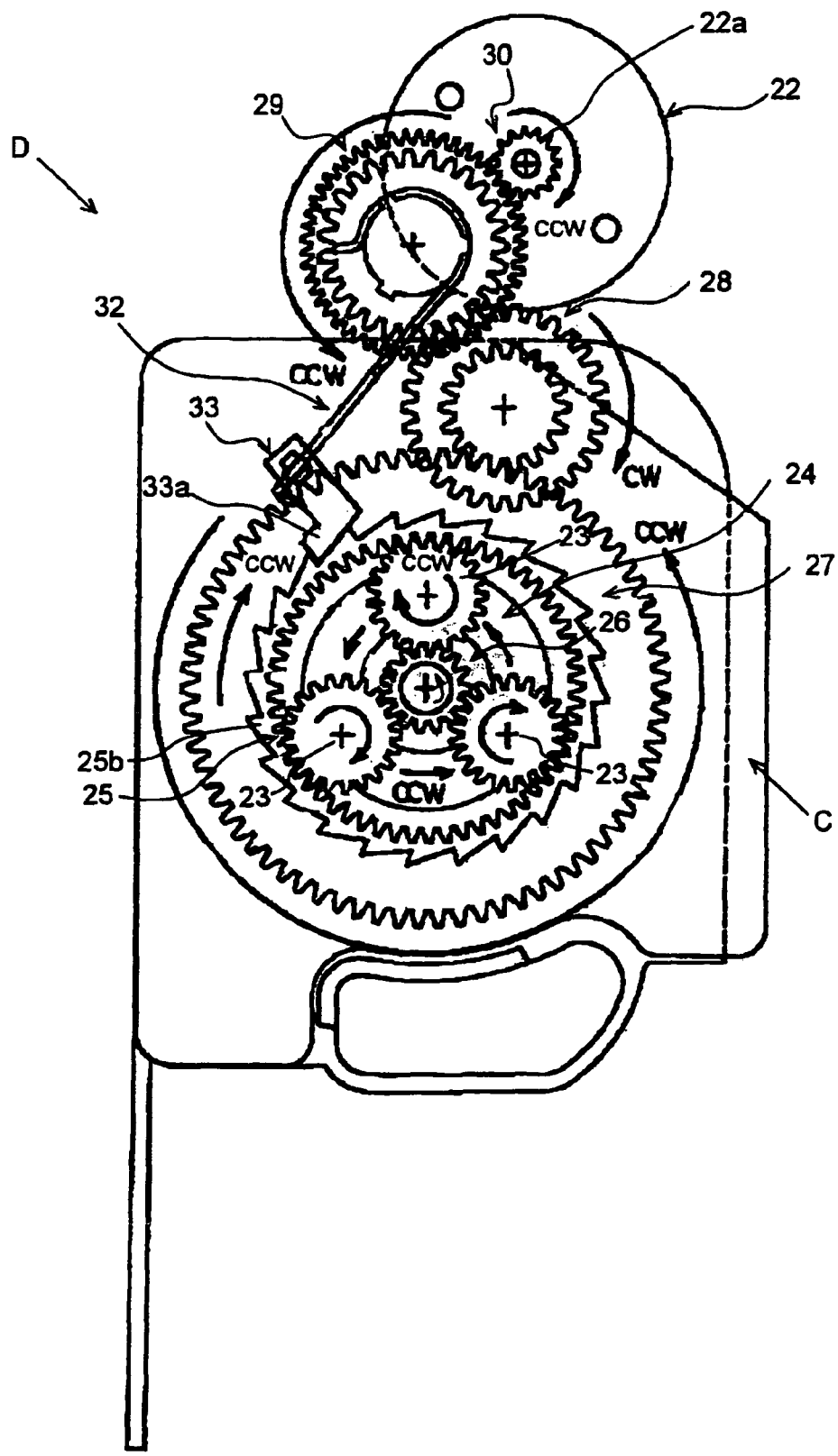
FIG. 10 is a front view showing a power transmission mechanism, showing a state that the transmission of power is allowed by a clutch mechanism.
Figure 11:
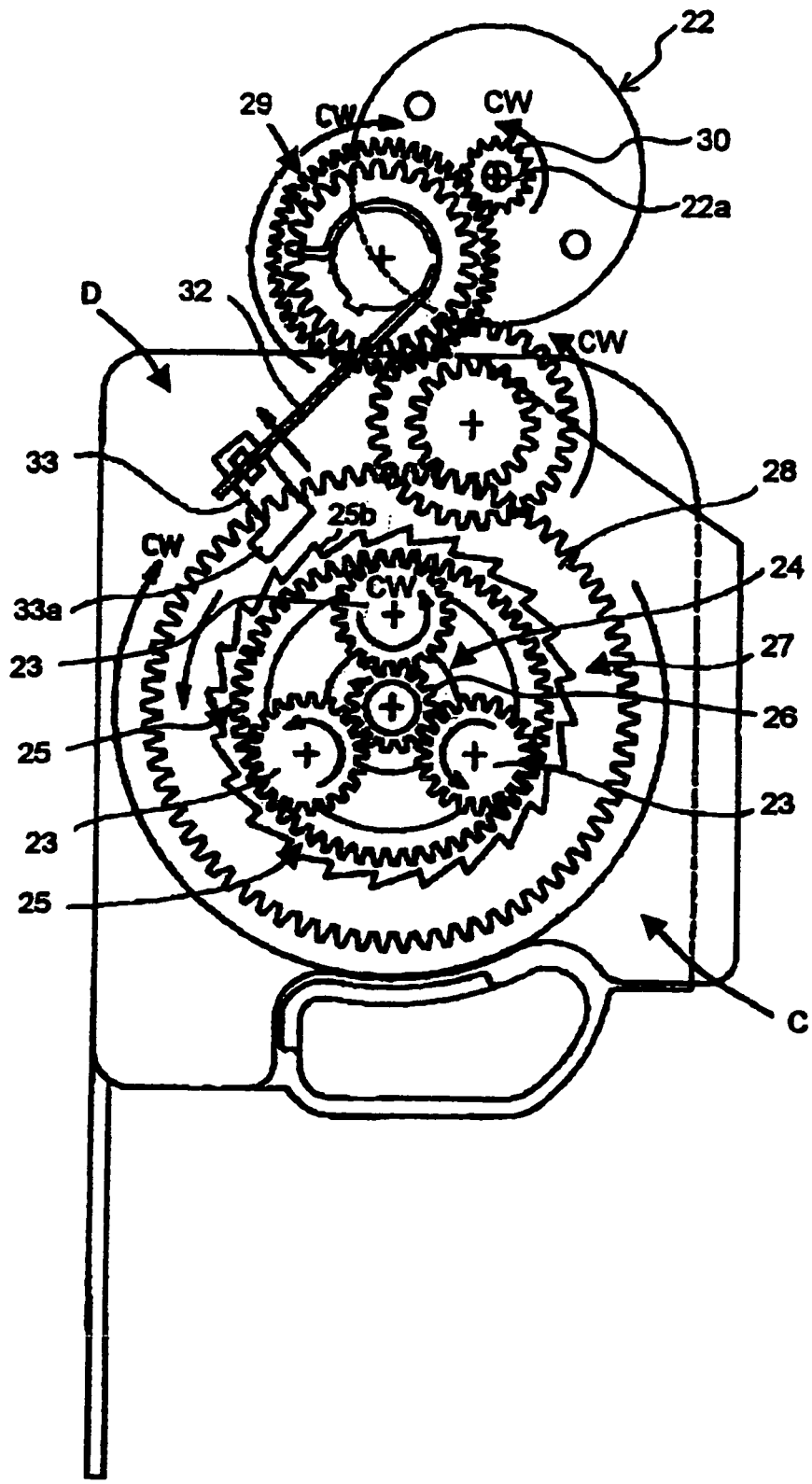
FIG. 11 is a front view showing the power transmission mechanism, showing a state that the transmission of power is blocked by the clutch mechanism.
Figure 12:
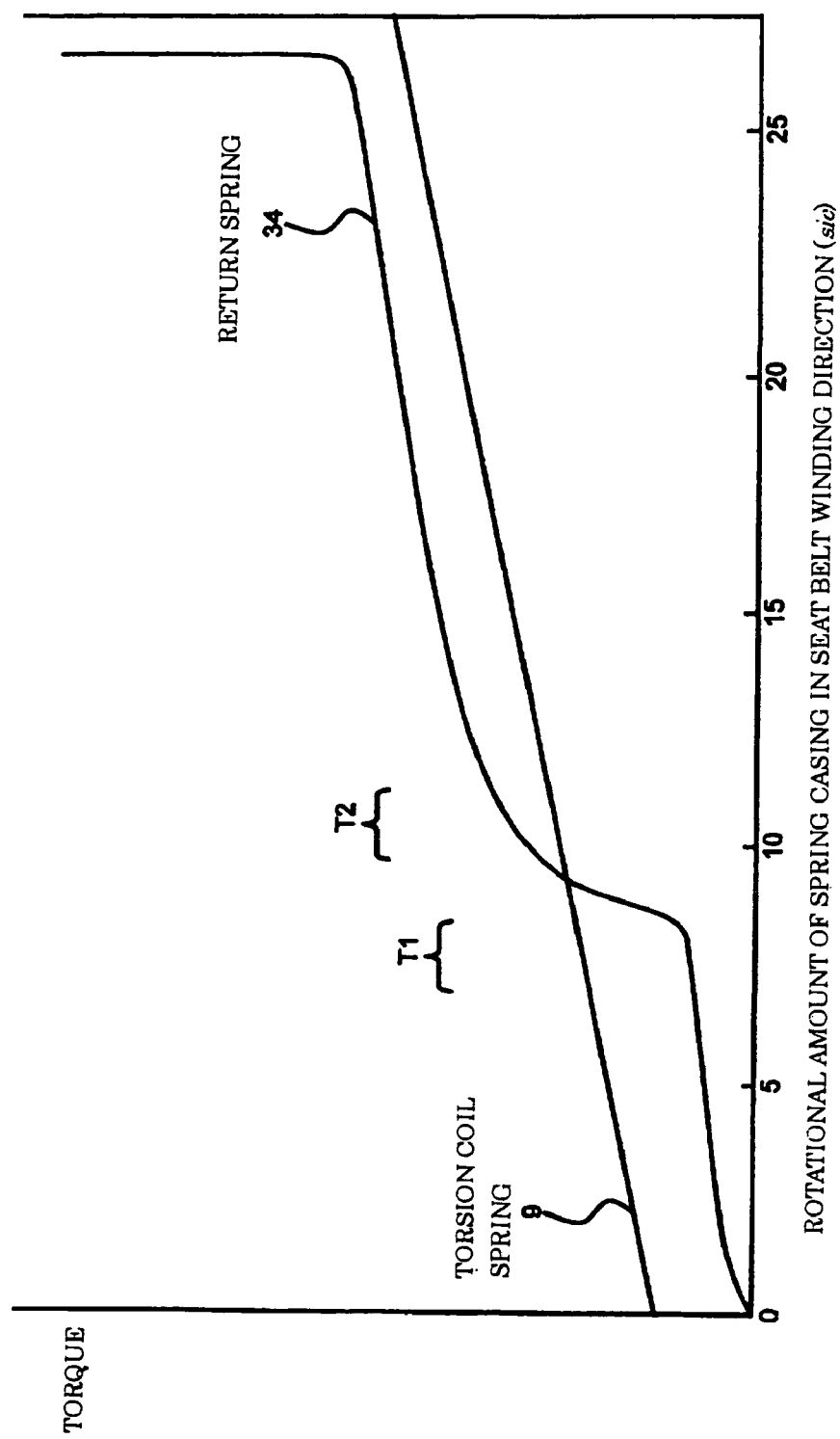
FIG. 12 is a characteristic diagram showing an example of characteristics of a return spring.
Figure 13:
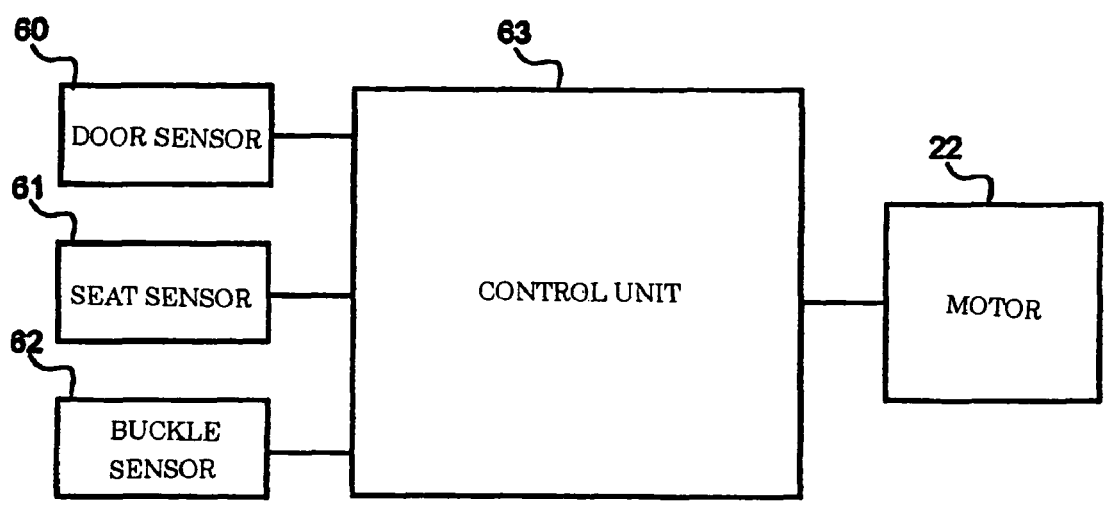
FIG. 13 is a control block diagram showing a control system.
Figure 14:
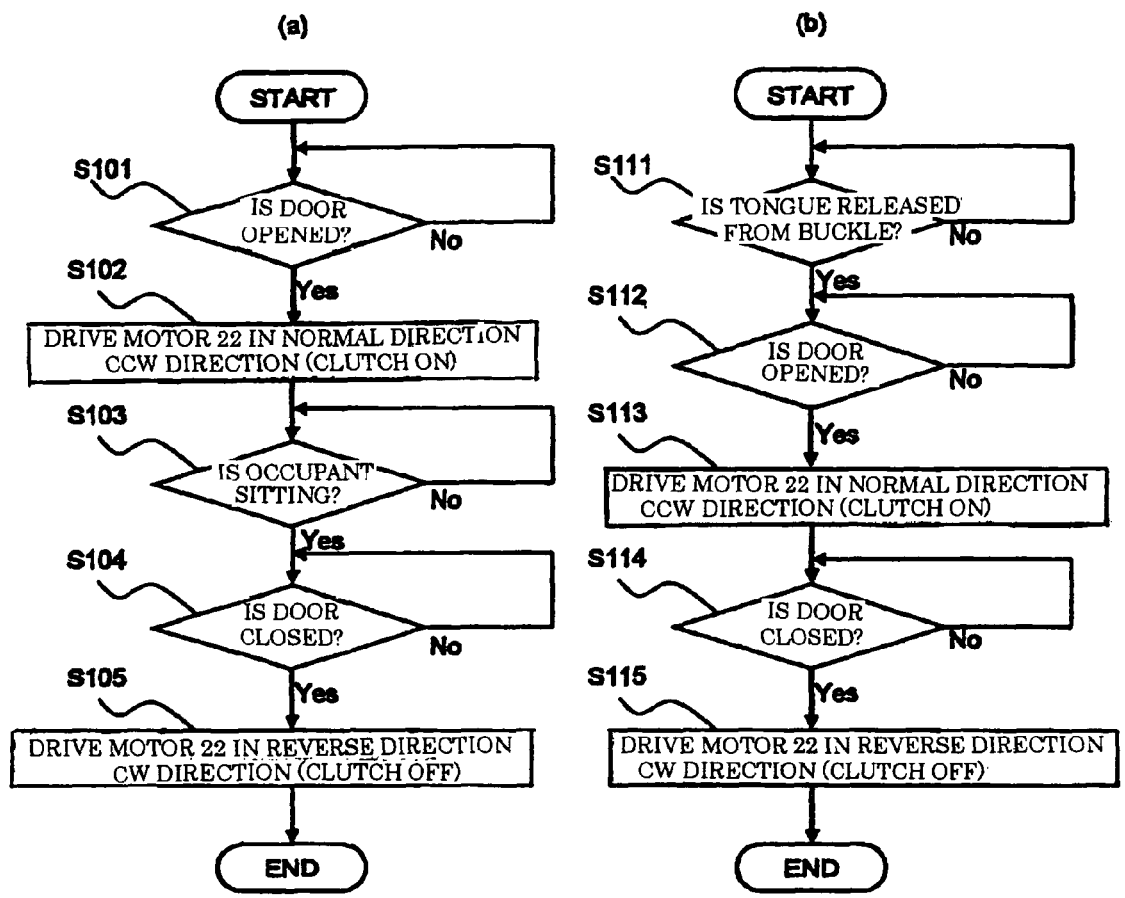
FIG. 14 is an operation flow chart of the seat belt apparatus.
Figure 15:
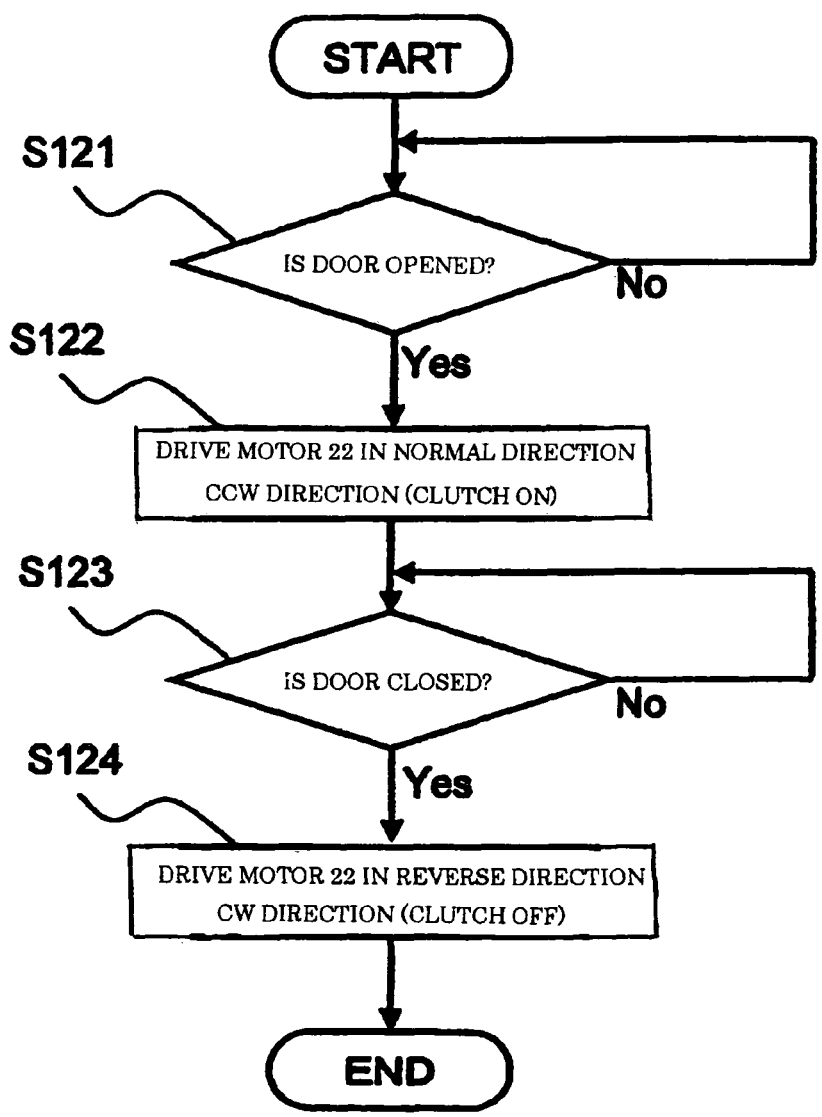
FIG. 15 is another operation flow chart of the seat belt apparatus.
Figure 16:
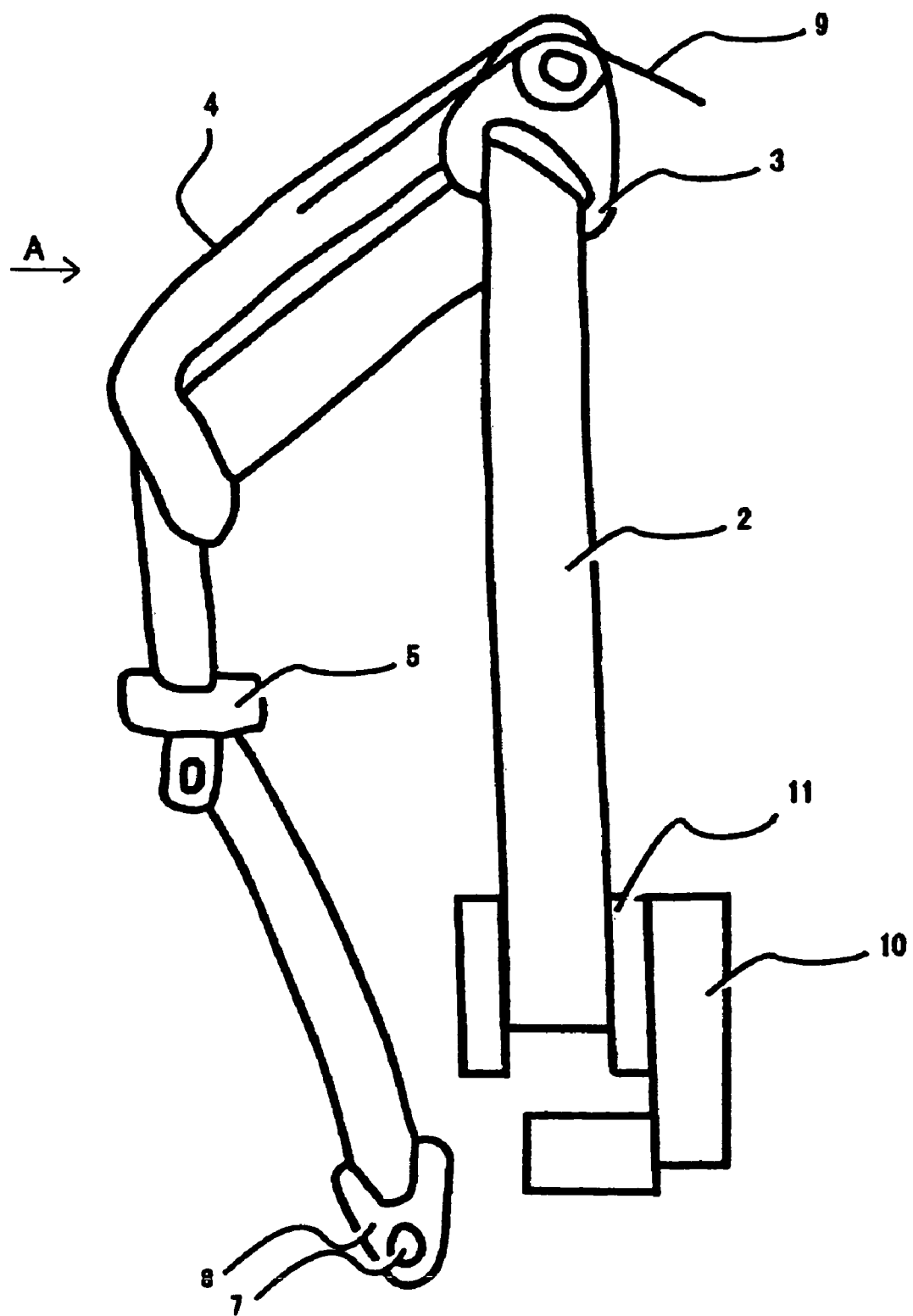
FIG. 16 is an illustration showing a variation in which a belt guide is pivotally held at its upper end.
Figure 17:
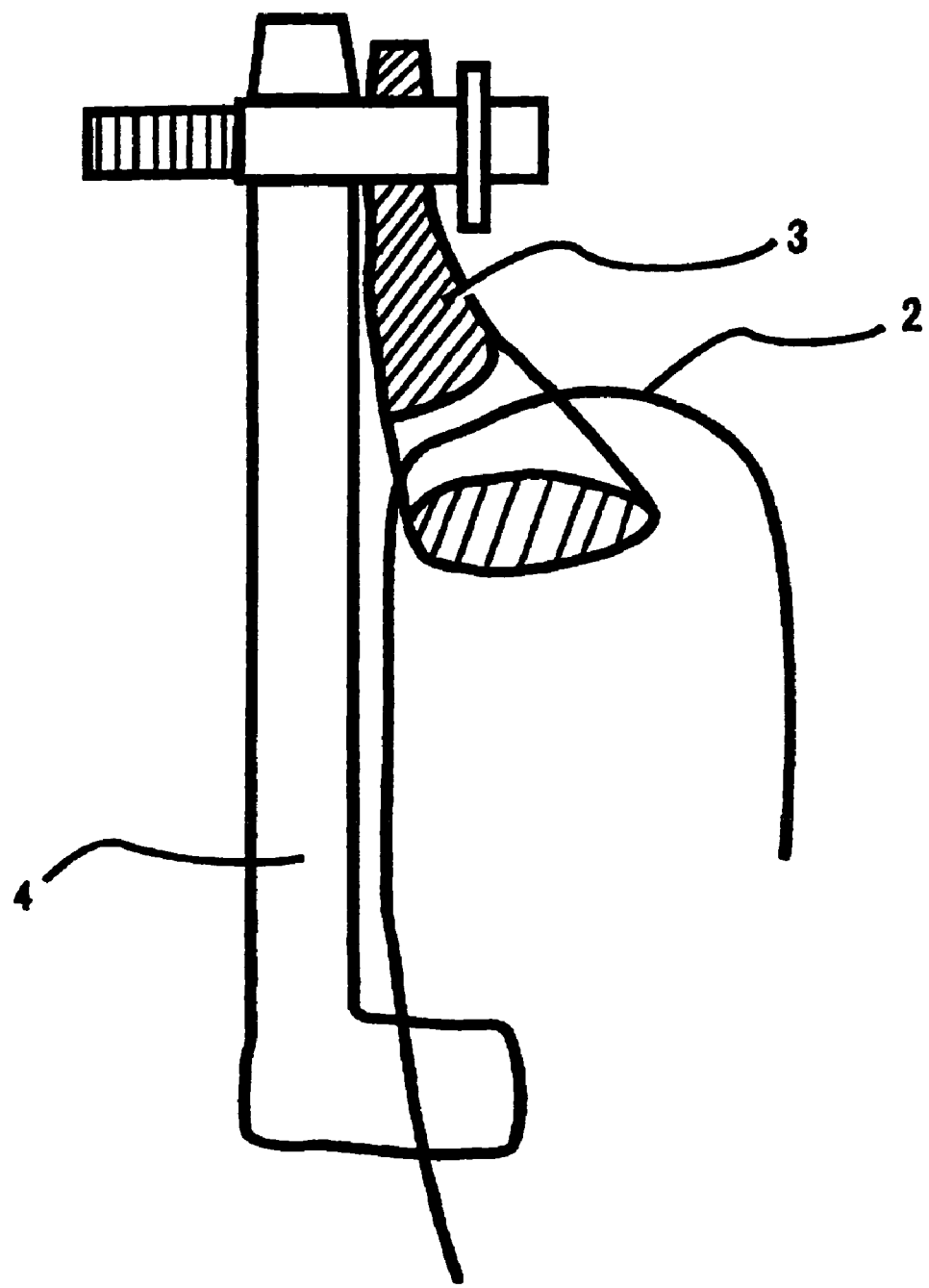
FIG. 17 is an illustration as seen in a direction of the arrow A of FIG. 16.

EXPLANATION OF REFERENCE SIGNS IN DRAWINGS 1 seat
1a seat back
2 seat belt
4 belt guide
5 tongue
6 buckle
9 torsion coil spring (spring)
10 retractor
11 reel
18 shaft
22 motor
C power transmission mechanism
23 planetary gears
24 carrier
25 internal gear
26 sun gear
27 large-diameter gear
28 intermediate gear
29 connecter gear
30 motor gear
D clutch mechanism
31 spring holding member
32 lever spring
33 engaging lever
33a claw
60 door sensor
61 seat sensor
62 buckle sensor
63 control unit

What is claimed is:
1. A seat belt apparatus comprising:
a retractor having a reel onto which one end side of a seat belt is wound;
a motor for rotating the reel;
a clutch mechanism which transmits driving power from a driving shaft of the motor to a shaft of said reel relative to rotation of the driving shaft of the motor in a seat belt winding direction and which blocks the transmission of the driving power from said driving shaft to the shaft of said reel relative to the rotation of said driving shaft in a seat belt withdrawing direction;
wherein the retractor includes a first spring to bias the reel of the retractor in the seat belt winding direction when the clutch mechanism is disengaged;
a belt guide which is supported at its proximal end pivotally in a forward/backward direction of the vehicle to guide another end side of said seat belt;
a second spring configured to bias said belt guide in the forward direction of the vehicle;
wherein the second spring has a biasing force initially greater than the biasing force of the first spring when the clutch mechanism is disengaged so that the belt guide is biased in the forward direction of the vehicle;
a buckle connected to a stationary member of said vehicle; and
a tongue which is disposed on said seat belt and can be latched into said buckle.

2. A seat belt apparatus as claimed in claim 1, further comprising:
   a door sensor for detecting the opening/closing of a door; and
   a control unit configured to control said motor of said retractor according to a detection signal of said door sensor.

3. A seat belt apparatus as claimed in claim 2, further comprising:
   a seat sensor for detecting when the occupant sits in a seat, wherein said motor of said retractor is controlled according to a detection signal of said seat sensor.

4. A seat belt apparatus as claimed in claim 1, wherein the biasing force of the first spring increases as the first spring is wound in the seat belt winding direction.

5. A seat belt apparatus as claimed in claim 1, wherein the biasing force of the first spring increases as the first spring is wound in the seat belt winding direction so that the biasing force of the first spring becomes greater than the biasing force of the second spring as the first spring is wound in the seat belt winding direction.

* * * * *